United States Patent [19]
Fletcher et al.

[11] 3,874,635
[45] Apr. 1, 1975

[54] ULTRASONICALLY BONDED VALVE ASSEMBLY

[76] Inventors: James C. Fletcher, administrator of the National Aeronautics and Space Administration, with respect to an invention by Richard J. Salvinski, Hacienda Heights, Calif.

[22] Filed: Sept. 28, 1973

[21] Appl. No.: 401,920

[52] U.S. Cl.................................. 251/333, 228/1
[51] Int. Cl...................... F16k 31/02, B23k 21/00
[58] Field of Search.......... 137/1, 13, 341; 251/333, 251/334; 228/1

[56] References Cited
UNITED STATES PATENTS
3,110,319  11/1963  Cirata............................ 137/341 X
3,543,383  12/1970  Freeman............................ 228/1 X

*Primary Examiner*—Alan Cohan
*Attorney, Agent, or Firm*—Monte F. Mott; Wilfred Grifka; John R. Manning

[57] ABSTRACT

A valve apparatus capable of maintaining a fluid tight seal over a relatively long period of time by releasably bonding a valve member to its seat is provided. The valve member is bonded or welded to the seat and then released by the application of the same energy to the bond joint. The valve member can be hollow to incorporate an ultrasonic bonding unit having an appropriate transducer. The valve member is held in place during the bonding by a clamping device. An appropriate force device can activate the opening and closing of the valve member. The choice of materials for the valve member and valve seat preferably provides an adequate sealing bond with little adhesion of material when the bond joint is broken for opening the valve member. Various combinations of material for the valve member and valve seat can be utilized such as a hard metal or ceramic with poor adhesion characteristics and a soft metal. Some illustrative materials are aluminum oxide, stainless steel, inconel, tungsten carbide as hard materials and copper, aluminum, titanium, silver, and gold as soft materials.

11 Claims, 2 Drawing Figures

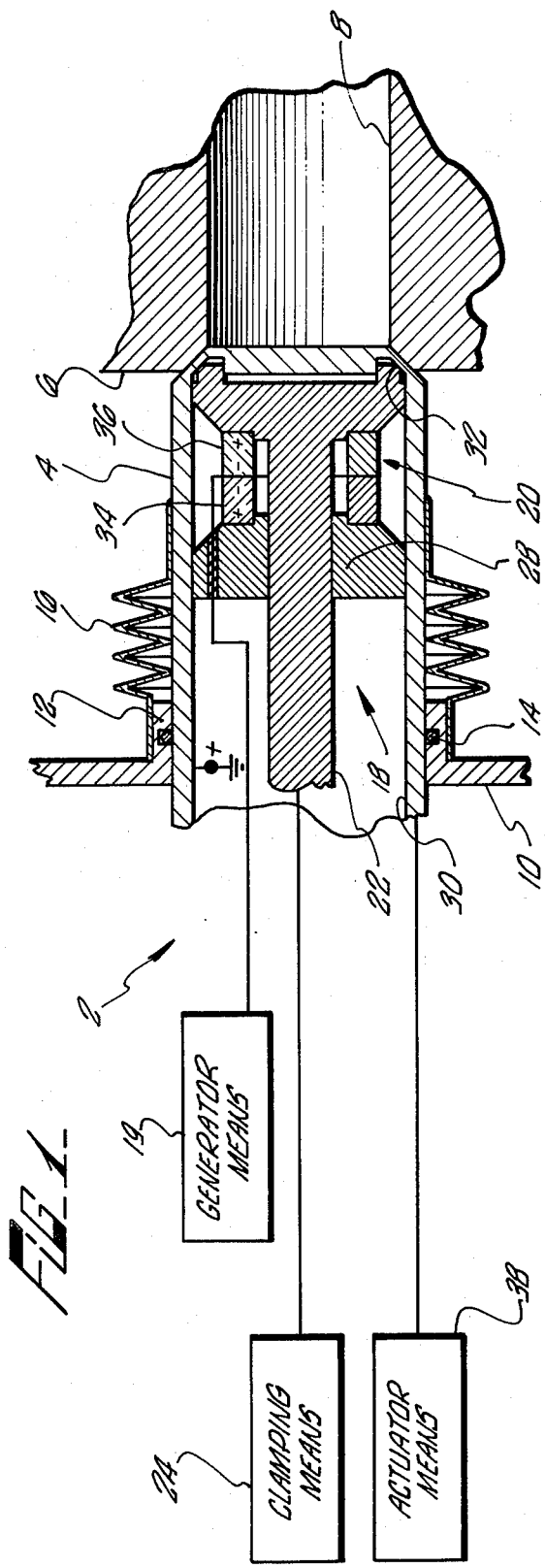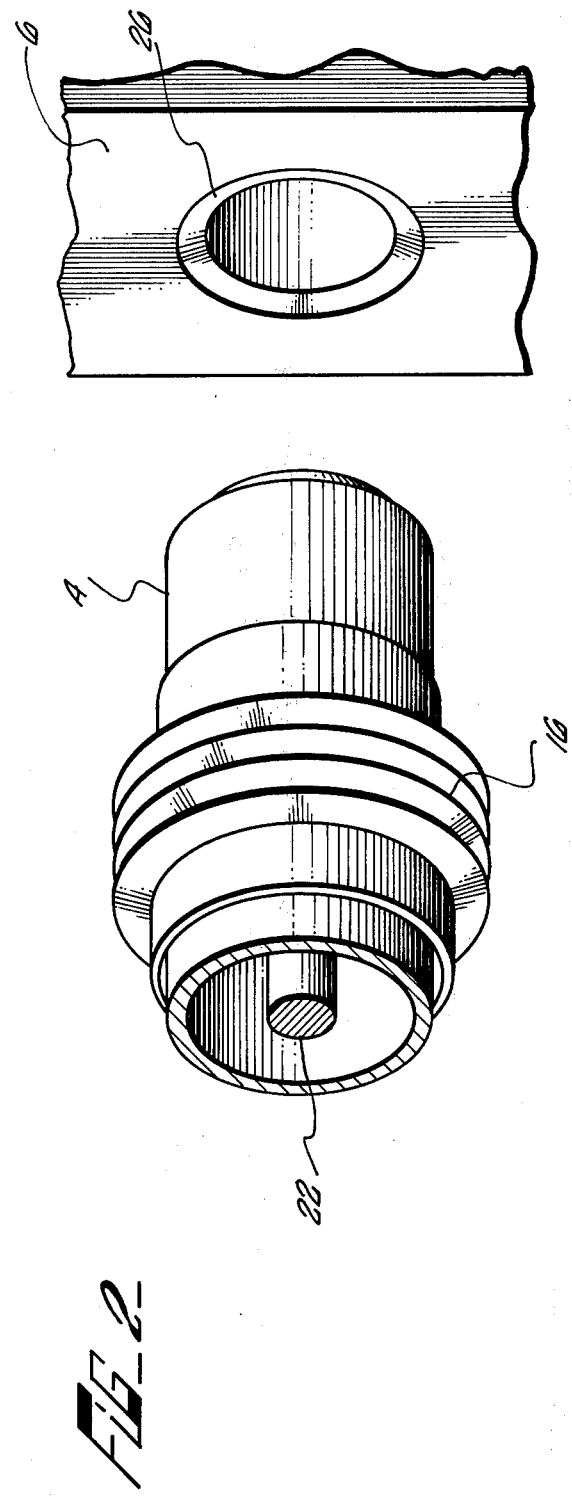

ULTRASONICALLY BONDED VALVE ASSEMBLY

BACKGROUND OF THE INVENTION

Origin of the Invention

The invention described herein was made in the performance or work under a NASA contract and is subject to the provisions of Section 305 of the National Aeronautics and Space Act of 1958, Public Law 85-568 (72 Stat. 435; 43 U.S.C. 2457).

FIELD OF THE INVENTION

The present invention generally relates to a valve apparatus and more particularly, to the sealing of the valve member to its valve seat in order to maintain a leak-proof seal over a long period of time.

Description of the Prior Art

Various forms of control valves utilizing a wide variety of actuators are well known in the prior art. Frequently, valves such as pilot valves are positioned remote from the operator and controlled by appropriate servo mechanisms. In valving systems that require a relatively leak-proof seal, it has been generally necessary to utilize some form of elastic seal or gasket frequently made from a rubber, plastic, and/or asbestos fiber material. The exact material of the seal will vary depending upon the fluid being controlled but it is generally required to be more elastic than the valve member and its corresponding valve seat. The seals are necessary since it is extremely difficult to maintain a leak-proof seal with a direct metal to metal contact between the valve and the valve seat.

Where the seals can be serviced or replaced, the problem of maintaining the seal over a long period of time is not particularly acute. However, in valving systems that are not readily accessible to a repairman, the problem becomes more acute. This problem is further compounded when the fluid has corrosive properties.

Volatile material is frequently utilized as rocket fuel on unmanned spacecraft having unserviceable valving systems that must remain relatively inactive over long periods of time. For example, a rocket propellant such as fluorine and other corrosive material cannot be used with conventional polymer seals and valve material. It is, however, essential to contain this corrosive fluid from the rest of the spacecraft equipment over a long period of time while at the same time having the fluid available when necessary. Accordingly, there is a demand in the prior art to provide a long term efficient seal in a valve assembly without the use of seal material between the valve elements.

OBJECTS AND SUMMARY OF THE INVENTION

It is a primary object of the present invention to provide a valve assembly that can maintain a fluid tight seal over a relatively long period of time.

It is another object of the present invention to effect the seal directly between the valve member and its seat by releasably bonding them together.

It is a further object of the present invention to ultrasonically bond the valve member and seat and subsequently ultrasonically release the valve member from its seat.

It is yet another object of the present invention to provide a hollow valve member that incorporates an ultrasonic bonding unit within the valve member.

It is yet a further object of the present invention to provide a valve member of a soft material such as soft metal and a valve seat of a hard material such as hard metal or ceramics with poor adhesion affinity to the soft material.

Briefly described, the present invention involves the direct bonding of a valve member to its respective seat to effectuate a fluid tight seal over a relatively long period of time, e.g., years. The bonding mechanisms can be reactivated to repeatedly release and bond the valve assembly as desired.

More particularly, the subject invention includes a hollow valve member that incorporates an ultrasonic bonding unit within the valve member. The bonding unit includes a transducer and a velocity transformer terminating in a hard welding or bonding tip. Generator means are provided to excite the transducer such as a pair of piezoelectric transducers. The valve member is made from a relatively soft material, such as soft metal while the valve seat is made from a relatively hard material such as hard metal or ceramics with a relatively poor adhesive affinity for the soft material. The application of ultrasonic energy to the interface of the valve member and valve seat creates a sealing bond. The sealing bond can be released to permit fluid flow by the same application of ultrasonic energy.

Further objects and the many attendant advantages of the invention may be best understood by reference to the following detailed description taken in conjunction with the accompanying drawings in which like reference symbols designate like parts throughout the figures thereof.

BRIEF DESCRIPTION OF THE DRAWINGS

FIG. 1 is a schematic cross-sectional diagram illustrating the principles of the present invention.

FIG. 2 is a schematic perspective view of the valve assembly of the present invention.

DESCRIPTION OF THE PREFERRED EMBODIMENT

The valve assembly of the present invention is capable of maintaining a fluid tight seal over a relatively long period of time by releasably bonding or welding a valve member to its seat. In the preferred embodiment, the bonding is effectuated ultrasoncially. The terminology "bonding" and "welding" is frequently utilized interchangeably in the field of ultrasonics. While the exact nature of ultrasonic bonding is not fully understood, it is believed that the term bonding is more correct in that a molecular attraction between the surfaces to be joined is apparently the major contributor to the strength of the final joint. However, it is believed that the concept of the present invention is sufficiently generic to encompass both the bonding and welding characteristics of the joint that would seal the valve member to its seat and the following description will utilize both terms.

an explanation of ultrasonic welding theory is that the vibratory motion at the metal surfaces to be joined initially removes surface dirt and oxide layers. With the removal of this dirt and oxide, the contact area between the clean metals increases resulting in the metal innerfaces being joined.

The elements in an ultrasonic bonding system 18 can be broadly categorized as a transducer for providing the correct resonant frequency, a member for translating the oscillatory motion and preferably amplifying the oscillatory motion that can be called a velocity transformer, a welding tip attached to or part of the velocity transformer for applying the motion to the workpiece and an anvil or support for the surfaces to be joined. The actual optimum frequency will depend on the particular materials and the normal range is generally between 10,000 to 60,000 cps.

One of the particular advantages of ultrasonic welding in the present invention is that no applied heat is necessary. Generally, the temperature reached during the ultrasonic welding of many materials is 400°C of less. If normal welding was to be utilized, for example, in the cryogenic condition which would be found on a spacecraft, then additional insulation would be needed around this heat source which could be prohibitive from a weight standpoint. In addition, normal forms of thermal welding require large amounts of electrical power which would seriously drain any available electrical reservoir of a spacecraft. For a valve with a quarter of one-half inch orifice, it is estimated that a 200–300 watt, 10,000 to 20,000 volt source of power for ultrasonic welding would be required. However, since the ultrasonic transducer needs to be energized only for a few milliseconds at a very low current, this source of power is readily available. For example, the power requirement can be met by a simple capacitor discharge network.

The relative conductivity of the members to be bonded is not a relevant factor in ultrasonic welding and, therefore, non-metal can be joined to metals or to non-metals. Since ultrasonic welding is carried out with the metals in the solid state, there is no tendency for alloys or intermetallics to form in the weld zone when dissimilar metals are joined and the absence of high temperature also eliminates the cast structure which is typical of welds made by fusion. In fact, ultrasonic welding is capable of bonding various forms of plastics to each other. The theory of plastics welding appears to be based upon the fact that two surfaces that are placed in close contact with each other will adhere due to interatomic or intermolecular attraction. On a microscopic scale, the surfaces of solids are not smooth with the result that when two surfaces are pressed together, they only touch at a few points. Hence, most of the surface area has no contact with the opposite face and thus there is little adhesion. Furthermore, most surfaces are covered with various forms of deposits of oil, moisture, oxides, etc., and these deposits further reduce the tendency of the two surfaces to adhere. With the case of plastic, it appears that ultrasonic welding actually acts in a cleaning fashion to produce the bonding of the plastics. The intense vibratory energy at the tip of the ultrasonic transformer 22 causes the surface peaks of the two surfaces being joined to be flattened and thus causes the plastics to flow on either side of the peak. Thus, the contact area between the materials improves and in addition, some cleaning of these areas also takes place. Finally, the heat that is generated would also assist the plastics to flow. Plastics successfully welded with ultrasonics include oriented polyesters, polyamides, polyethylenes, polypropylenes, polystyrenes, vinyls, some fluorocarbons, and polycarbonates.

For a more detailed description of the theory of ultrasonic welding and the various forms of equipment that can be utilized, reference is made to ULTRASONICS: THEORY AND APPLICATION, George L. Gooberman, English Universities Press, 1968 and HIGH-INTENSITY ULTRASONICS, Brown and Goodman, D. Van Nostrand Co., Inc., 1965, which are incorporated herein by reference.

Referring to FIGS. 1 and 2 of the drawings, an illustrative embodiment of the broad, general principles of the present invention is disclosed utilizing ultrasonic bonding or welding as the preferred method of sealing.

A valving assembly 2 includes a relatively movable poppet or valve member 4 adapted to seat directly against a valve seat body 6, incorporating an appropriate fluid conduit 8. The valve member 4 is mounted in a bracket member 10 having a circular flange 12. The circular flange 12 serves as a guide for the valve member 4 as it moves relative to the valve seat body 6 and the valve seat face 26.

An o-ring sealing member 14 can be mounted in an appropriate slot in the circular flange to seal against the valve member 4. In addition, or in the alternative, a bellows sealing sleeve 16 can be appropriately fastened for example by welding it to both the circular flange member 12 and the valve member 4.

The valve member 4 is hollow and is designed to accommodate the components of an ultrasonic bonding system 18. Basically, the ultrasonic bonding system 18 will include an electronic generator means 19 for producing electrical oscillations at the required frequency, a transducer 20, a velocity transformer 22, clamping means 24 for applying a clamping force and finally, means for supporting the valving member 4 during bonding which in this case is the valve seat body 6. A welding tip 32 is provided on the velocity transformer 22 and directly applies the ultrasonic bonding energy to the interface of the valve member 4 and the valve seat face 26.

A transducer mounting member 28 having a stepped surface can be fixed to the inside wall 30 of the valve member 4 for holding the transducer 20 in an operative position. Other forms of mounting arrangements could be utilized for both the velocity transformer 22 and the transducer 20. Accordingly, the illustrated present arrangement of the components of the ultrasonic bonding system 18 should not be considered as limiting the scope of the present invention. It should also be realized that either a lateral or normal application of the ultrasonic bonding force to the interface of the surfaces to be bonded could be utilized as opposed to the illustrated application of ultrasonic force to the inclined surfaces of the valve seat 26 and valve member 4.

The transducer 20 can comprise in the illustrated embodiment a pair of ring piezoelectric transducers 34 and 36 that are mounted with their negative poles adjacent each other. This particular mounting arrangement simplifies the insulation of the transducers 34 and 36 since it permits the ground poles of the piezoelectric transducers 34 and 36 to be respectively mounted without insulation on the stepped surface of the transducer mounting member 28 and the stepped surface of the velocity transformer 22. The valve member 4 with the velocity transformer 22 and transducer mounting member 28 are at ground potential.

The piezoelectric transducers 34 and 36 can be made from a large number of materials that are commercially available such as quartz, lead zirconate-titanate crystals, barium titanate or other similar electro-restrictive materials that change length when subject to an electric field parallel to the plane of polarization. Magneto-restrictive material can also be utilized as a transducer 20 such as nickel, cobalt-nickel (4 percent Co-Ni), alfenol (13 percent Al-Fe), 45 permalloy (45 percent Ni-Fe), 7A2 ferrite (Ni, Cu, Co ferrite). The ceramic barium and lead zirconate electro-restrictive material are preferable as transducers since they are rugged and have conversion efficiencies generally more than twice that of a magneto-restrictive device. It should be realized that the particular transducers 20 are simply a question of design to meet the design criterion of the particular valve assembly.

As disclosed in FIG. 1, a valve actuator means 38 can be utilized to open the valve member 4 relative to the valve seat 26. In addition, a clamping force is provided by the clamping means 24 to hold the valve member 4 against the valve seat 26 for purposes of bonding. It is possible that the same clamping force developed by the clamping means 24 could also be utilized to open or close the valve member 4 thus doing away with the necessity of the actuator means 38. The clamping means 24 and the actuator means 38 can comprise hydraulic, electromagnetic or even spring actuators as desired. The clamping force generated by the clamping means 24 is applied on the inclined surfaces to be bonded which in this case is the innerface surface between the valve member 4 and the valve seat face 26. The valve seat body 6 serves the function of an anvil or sonotrode during the ultrasonic bonding. The valve seat body 6 must be sufficiently large from an acoustical viewpoint to prevent the excessive loss of ultrasonic energy. This ultrasonic energy is applied through the velocity transformer 22 to the transformer bonding tip 32 which is held against the valve member 4 as a result of the clamping force on the clamping means 24. The bonding tip 32 can be made from a hard material such as titanium or stainless steel. The actual clamping force will depend upon the relative size of the valve member 4 and the relative materials of the valve member 4 and the valve seat face 26. The clamping force is generally empirically determined and if the force is too low, slippage frequently can occur at the faying surface and a poor bond is made. Too great of a clamping force will create excessive damage to the surface contacted by the bonding tip 32. The valve seat body 6 or anvil is designed acoustically for controlled vibration compliance with periods of out of phase displacement in relation to the displacement of the velocity transformer 22.

The length of time during which ultrasonic vibrations must be applied to the bonding joint or innerface varies with the materials being welded and their thickness and is generally empirically derived.

The choice of the particular materials for the valve member 4 and the valve seat face 26 to form the bond joint or innerface weld can be empirically determined depending upon the particular design requirements. It is generally desirable to utilize material that will form a bond joint that provides a zero leakage of, for example, helium measured at $1 \times 10^{-6}$ scc. per second while permitting a disengagement of the weld joint with relatively little adhesive interaction between the material of the valve 4 and of the valve seat face 26. In this regard, it is believed that metals with thicker oxide films should be preferred and that generally a metal and ceramic combination will provide the appropriate bond without too permanent of a fastening that would interfere with any desired opening of the valve assembly 2.

In the present invention, the valve member 4 can be formed from a soft material, such as copper, while the valve seat face 26 can be formed from a hard material, such as aluminum oxide.

Other types of soft materials can be gold, silver, aluminum, titanium and even plastics. Both hard metals and non-metallics can be used such as inconel, stainless steel, tungsten carbide as a hard material. These examples are offered merely as illustrations and are not intended to be limiting to the scope of the present invention. It is even possible to utilize a coating material such as cadmium or other soldering or brazing types of material as a soft material. Preferably, the soft material is utilized on the valve member 4 and the hard material on the valve seat face 26. The terms "soft" and "hard" are used in a relative fashion in defining the present invention. Basically, the hard material will be a ceramic or hard metal having a relatively poor adhesive affinity to the soft material which can be a soft metal such as copper or aluminum. The design parameters in picking the appropriate materials combination is to provide materials that will provide an adequate bond over the desired sealing life but they are capable of being separated as desired without destroying their function or shape. In this regard, a limited design cycle of, for example, 20 cycles can dictate the applicable materials.

Various forms of bondable material are known in the prior art and, for example, can be found in the JPL report no. 12411-6012-ROOO, July, 1970, Advanced Spacecraft Valve Technology Compilation from which the following table of weldable materials using ultrasonics is set forth.

|   | Al | Be | Cu | Ge | Au | Fe | Mg | Mo | Ni | Nb | Pd | Pt | Si | Ag | Ta | Sn | Ti | W | U | Zr |
|---|----|----|----|----|----|----|----|----|----|----|----|----|----|----|----|----|----|---|---|----|
| Al and alloys | x | x | x | x | x | x | x | x | x |   | x | x | x | x | x | x | x | x | x | x |
| Be and alloys |   | x | x |   | x |   |   |   |   |   |   |   |   |   |   |   | x |   |   |   |
| Cu and brass  |   |   | x |   | x | x | x | x |   |   | x |   | x |   |   |   | x |   |   | x |
| Germanium     |   |   |   |   |   | x |   |   |   |   |   | x |   |   |   |   |   |   |   |   |
| Gold          |   |   |   |   | x | x |   |   | x |   | x |   |   |   |   |   | x | x |   | x |
| Iron and steel|   |   |   |   |   | x |   | x | x | x | x | x | x |   |   |   | x | x | x | x |
| Mg and alloys |   |   |   |   |   |   | x |   |   |   |   | x | x |   |   |   | x |   |   |   |
| Mo and alloys |   |   |   |   |   |   |   | x | x |   |   |   |   | x |   |   | x | x |   | x |
| Ni and alloys |   |   |   |   |   |   |   |   | x | x |   | x |   |   |   |   | x | x |   |   |
| Nb and alloys |   |   |   |   |   |   |   |   |   | x |   |   |   | x |   |   |   |   |   |   |
| Pd and alloys |   |   |   |   |   |   |   |   |   |   | x |   |   | x |   |   |   |   |   |   |
| Pt and alloys |   |   |   |   |   |   |   |   |   |   |   | x | x |   |   |   |   |   |   |   |
| Silicon       |   |   |   |   |   |   |   |   |   |   |   |   |   | x |   |   |   |   |   |   |
| Ag and alloys |   |   |   |   |   |   |   |   |   |   |   |   |   | x | x |   |   |   |   | x |
| Ta and alloys |   |   |   |   |   |   |   |   |   |   |   |   |   |   | x |   | x | x |   |   |
| Tin           |   |   |   |   |   |   |   |   |   |   |   |   |   |   |   | x |   |   |   |   |
| Ti and alloys |   |   |   |   |   |   |   |   |   |   |   |   |   |   |   |   | x |   |   |   |
| W and alloys  |   |   |   |   |   |   |   |   |   |   |   |   |   |   |   |   |   | x |   |   |
| Uranium       |   |   |   |   |   |   |   |   |   |   |   |   |   |   |   |   |   |   | x | x |
| Zr and alloys |   |   |   |   |   |   |   |   |   |   |   |   |   |   |   |   |   |   |   | x |

As an alternative form of the present invention, the valve member 4 can be solid and act directly as the velocity transformer for welding to the valve seat face 26. In the preferred embodiment, the weld or bonding tip 32 is generally formed from a hard material such as stainless steel and will not bond to the valve member 4 although the valve assembly 2 can operate with the tip 32 bonding to the valve member 4.

While not disclosed, it would even be possible to have the transducer 20 driven by an electronic amplifier which may be self-exciting by means of an accelerometer pickup crystal fixed to the transducer 20 to insure that the system would vibrate at the correct resonant frequency.

While a preferred embodiment of the present invention has been described hereinabove, it is intended that all matter contained in the above description and shown in the accompanying drawings be interpreted as illustrative and not in a limiting sense and that all modifications, constructions, and arrangements which fall within the scope and spirit of the invention may be made.

What is claimed is:

1. A valve apparatus for providing a repeatable fluid-tight seal capable of controlling corrosive liquid and the like in a spacecraft comprising:

a valve member having a first sealing surface;

a valve seat member having a second sealing surface and a fluid conduit adapted to receive the valve member, one of the sealing surfaces of the valve member and the valve seat member being made from a relatively soft material and the other member being made from a relatively hard material having the characteristics of being ultrasonically bondable to the soft material and having a relatively slight adhesive affinity for the soft material;

actuator means for controlling the fluid conduit by moving the valve member relative to the valve seat member;

ultrasonic transducer means for producing both the formation of an ultrasonically welded bond joint between the first sealing surface of the valve member and the second sealing surface of the valve seat member to provide a closed sealed position and the separation of the ultrasonically welded bond joint to release the valve member from the valve seat member to provide an open valve position including clamping means for holding the respective sealing surfaces directly against each other while in their solid state during the formation of the welded bond joint directly between the sealing surfaces as they remain in their solid state; and means for actuating the ultrasonic transducer means at a frequency characteristic of the materials of the first sealing surface and the second sealing surface member to effectuate the formation and separation of the ultrasonic welded bond joint directly between the sealing surfaces while the respective sealing surface materials are in a solid state whereby a fluid-tight sealing bond joint can be effectuated and the sealing surface materials can be subsequently released with relatively slight adhesive interaction and deformation of the respective sealing surfaces thereby permitting repetitive fluid-tight bonding of the sealing surfaces.

2. The invention of claim 1 wherein the ultrasonic transducer means for producing the formation and separation of the bond joint includes an ultrasonic transducer operatively connected to the valve member for ultrasonic welding of the valve member and the valve seat member.

3. The invention of claim 1 wherein the valve member has a bore and the ultrasonic transducer means for producing the formation and separation of the bond joint includes an ultrasonic transducer and a velocity transformer, the velocity transformer operatively connected to the ultrasonic transducer and mounted within the bore of the valve member.

4. The invention of claim 1 wherein the valve member is hollow and at least part of the ultrasonic transducer means for producing the formation and separation of the bond joint is mounted within the valve member and operatively connected to that portion of the valve member that contacts the valve seat member.

5. The invention in claim 1 wherein one of the valve member and valve seat member comprises a metal and the other comprises a ceramic.

6. The invention of claim 1 wherein one of the valve member and valve seat member is copper and the other is aluminum oxide.

7. The invention of claim 1 wherein the ultrasonic transducer means is a magneto-restrictive member.

8. The invention of claim 1 wherein the ultrasonic transducer means is a piezoelectric member.

9. The invention of claim 1 wherein the ultrasonic transducer means is a pair of piezoelectric ring members mounted with their ends abutting each other and having a common polarity.

10. The invention of claim 1 wherein the valve member is hollow and the ultrasonic transducer means for producing the formation and separation of a bond joint includes a velocity transformer and a transducer mounting member, the clamping means exerting a force to hold the transformer against the valve member, the ultrasonic transducer, the velocity transformer and transducer mounting member being positioned inside and valve member with the transducer being operatively positioned between the transducer mounting and the velocity transformer.

11. A valve apparatus for providing a repeatable fluid-tight seal capable of controlling corrosive liquid and the like in a spacecraft comprising:
a hollow valve member having a first sealing surface;
a valve seat member having a second sealing surface and a fluid conduit adapted to receive the valve member, one of the sealing surfaces of the valve member and the valve seat member being made from a relatively soft material and the other member being made from a relatively hard material having the characteristics of being ultrasonically bondable to the soft material and having a relatively slight adhesive affinity for the soft material;
actuator means for controlling the fluid conduit by moving the valve member relative to the valve seat member;
ultrasonic transducer means in the hollow valve member for producing both the formation of an ultrasonically welded bond joint between the first sealing surface of the valve member and the second sealing surface of the valve seat member to provide a closed sealed position and the separation of the ultrasonically welded bond joint to release the valve member from the valve seat member to provide an open valve position including an ultrasonic transducer, a velocity transformer and a transducer mounting member positioned inside the hollow valve member, the transducer being operatively positioned between the transducer mounting member and the velocity transformer and further including clamping means for holding the respective sealing surfaces directly against each other while in their solid state during the formation of the welded bond joint directly between the sealing surfaces as they remain in their solid state; and
means for actuating the ultrasonic transducer means at a frequency characteristic of the materials of the first sealing surface and the second sealing surface member to effectuate the formation and separation of the untrasonic welded bond joint directly between the sealing surfaces while the respective sealing surface materials are in a solid state whereby a fluid-tight sealing bond joint can be effectuated and the sealing surface materials can be subsequently released with relatively slight adhesive interaction and deformation of the respective sealing surfaces thereby permitting repetitive fluid-tight bonding of the sealing surfaces.

* * * * *